United States Patent

[11] 3,539,218

[72] Inventors Roscoe T. Fowler
Ellicott City, Maryland;
Harold B. Kaufman, Jr., New York, New York
[21] Appl. No. 770,883
[22] Filed Sept. 9, 1968
Original application Aug. 23, 1967, Ser. No. 662,696, Patent No. 3,450,070
[45] Patented Nov. 10, 1970
[73] Assignee DCA Food Industries, Inc.
New York, New York
a corporation of New York

[54] MACHINE FOR THE PRODUCTION OF FROZEN STICK CONFECTIONS
4 Claims, 13 Drawing Figs.

[52] U.S. Cl........................................................ 294/87
[51] Int. Cl......................................................... B66c 1/10
[50] Field of Search............................................ 294/87, 87H

[56] References Cited
UNITED STATES PATENTS
2,253,909  8/1941  Loewenstein ................ 294/87
2,461,844  2/1949  Overland....................... 294/87

Primary Examiner—Harvey C. Hornsby
Attorney—Amster & Rothstein

ABSTRACT: In a machine for continuously forming frozen confections, in which successive mold strips are transported through filling, freezing, stick inserting and extraction stations, the mold strips each include a plurality of laterally spaced pairs of separate open-topped molds, and longitudinally spaced hoppers are provided with longitudinally spaced sets of metering pumps and mold filler nozzles, the nozzles of one set being aligned with one of the molds of each pair and the nozzles of the other set being aligned with the other molds, the nozzles being actuated when respective molds are vertically aligned therewith. The stick extractor includes an extractor bar provided with a jaw member for each pair of sticks which have associated therewith opposing pairs of laterally spaced detent elements urged toward the jaw members to permit the positive engagement of corresponding pairs of sticks which may differ in thickness.

Patented Nov. 10, 1970

INVENTORS
ROSCOE T. FOWLER
HAROLD B. KAUFMAN, JR.

William R. Lieberman
ATTORNEY

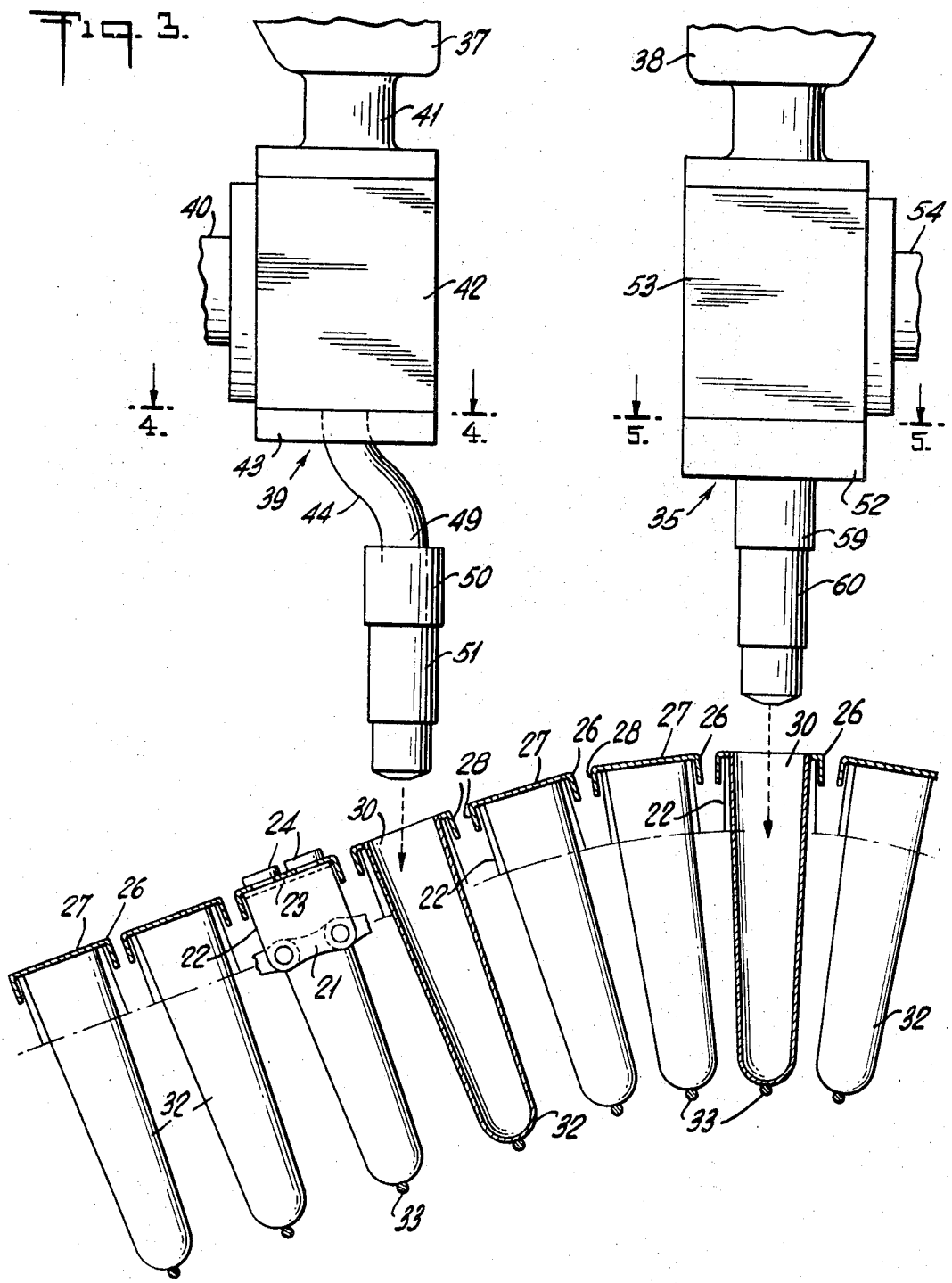

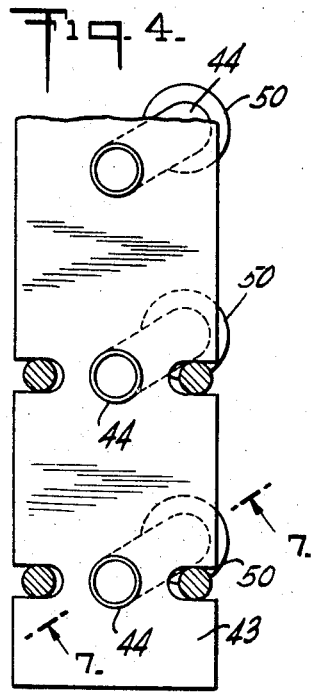
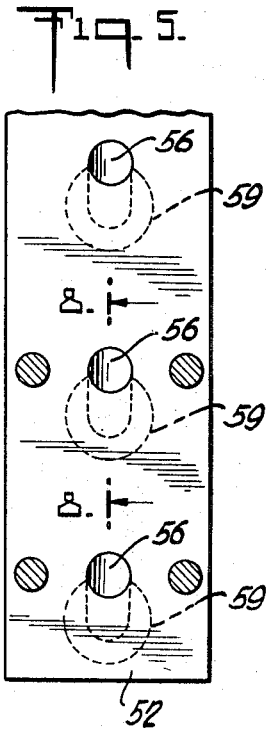
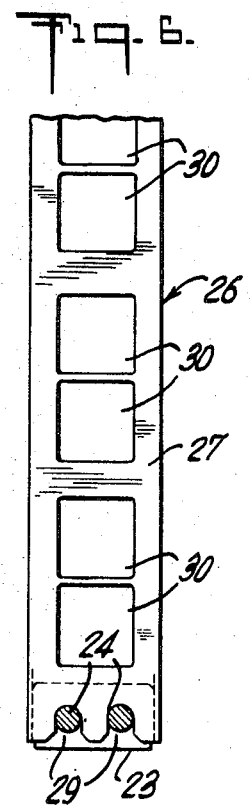
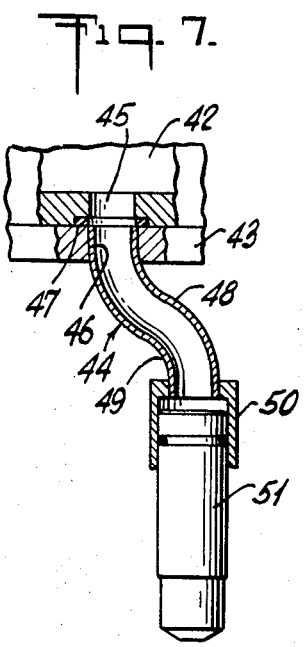
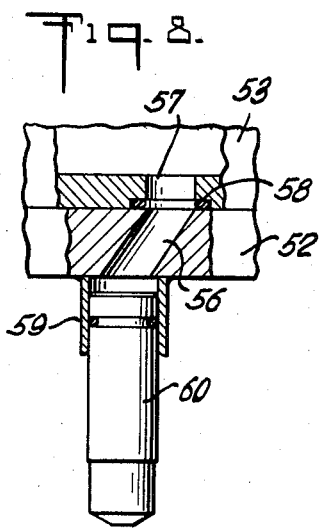

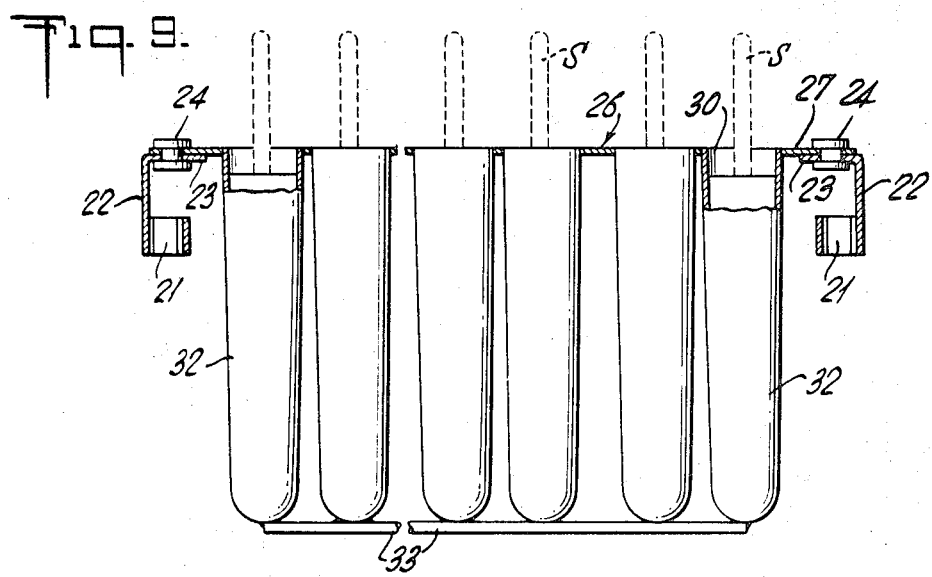
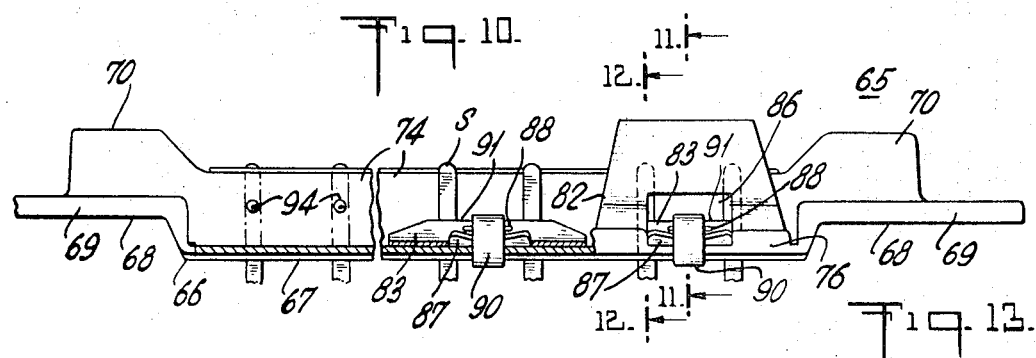
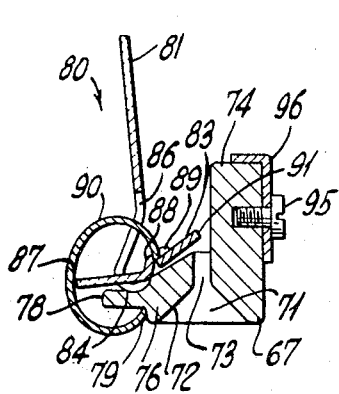
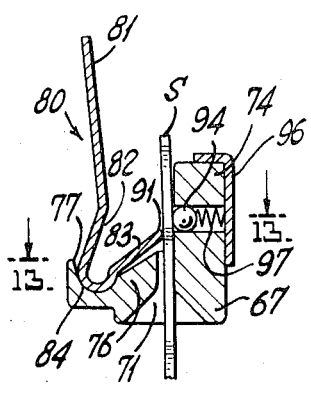
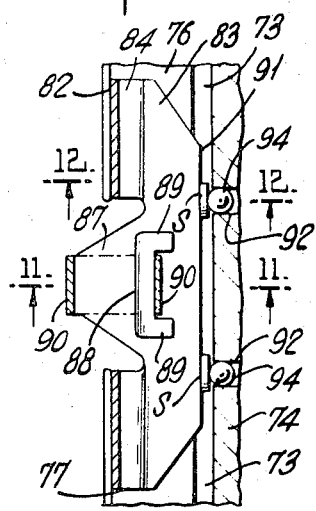
INVENTORS
ROSCOE T. FOWLER
HAROLD B. KAUFMAN
William R. Lieberman
ATTORNEY

MACHINE FOR THE PRODUCTION OF FROZEN STICK CONFECTIONS

This application is a division of Ser. No. 662,696 filed Aug. 23, 1967, now U.S. Pat. No. 3,450,070.

BACKGROUND OF THE INVENTION

The present invention relates generally to improvements in machines for the production of frozen confections and it relates particularly to an improved machine for the continuous production of frozen stick confections.

In machines generally employed in the production of frozen stick confections, regularly spaced multicavity mold strips are transported by endless chains through a filler station, a freezing station, a stick inserter station, a frozen confection loosening station and an extractor station. At the filler station a confection fluid is metered into the individual molds which are then transported substantially immersed in cold brine or other cooling medium, the extractor station being located between the ends of the freezing station and functioning to insert sticks into the partially frozen relatively thick confection. The molds containing the thus sticked frozen confection are then heated to loosen the confection mold interface, the sticks being engaged by extractor bars which raise and separate the frozen confections from the mold and transfer them to a bagging or packaging station.

While the conventional frozen stick confection producing machines operate reasonably satisfactorily they do possess drawbacks and disadvantages. They are limited in the variety and number of different confections they can produce under continuous running conditions and in the packaging combinations which may be achieved. In addition, these machines are of relatively low capacity and of limited versatility and adaptability.

SUMMARY OF THE INVENTION

A principal object of the present invention is to provide an improved machine for the production of frozen confections.

Another object of the present invention is to provide an improved machine for the continuous production of frozen stick confections.

Still another object of the present invention is to provide an improved frozen stick confection producing machine in which a great variety of frozen confections of different flavors and compositions may be simultaneously produced and bagged or packaged in a large number of different combinations.

A further object of the present invention is to provide an improved apparatus of the above nature which is readily and easily adaptable to existing equipment and is characterized by its high versatility and efficiency.

The above and other objects of the present invention will become apparent from a reading of the following description taken in conjunction with the accompanying drawing.

In a sense, the present invention contemplates the provision of a frozen confection producing machine including a plurality of longitudinally spaced similar transverse mold strips each of which is provided with a multiplicity of transversely spaced open-topped mold cavities, and means for transporting said mold strips along a longitudinal path from a trailing section to a leading section, a pair of longitudinally spaced first and second liquid reservoir sections located along the trailing section of said path, a plurality of first metering devices and filler nozzles connected to said first reservoir section and having first discharge openings registering with the paths of alternate of said mold cavities, and a plurality of second metering devices and filler nozzles connected to said second reservoir section and having second discharge openings transversely offset relative to said first discharge openings and aligned with the other of said mold cavity paths. Advantageously, each of the reservoir sections includes a plurality of separate reservoirs, one or more metering device and nozzle assemblies communicating with each reservoir. The discharge openings of one set of nozzles are longitudinally offset and at a different level than the discharge openings of another set of nozzles.

The machine also advantageously includes an extractor mechanism for withdrawing the frozen confections in pairs, the mechanism comprising a bar having vertically extending stick receiving slots located along the length thereof bordered on one side by a first wall projecting above said slot and along the second side by a second wall, a jaw member swingably mounted on said second wall and having a stick engaging edge located in vertical registry with at least one of said slots and resiliently urged toward said first wall, and a plurality of detents positioned along the face of said first wall opposite said jaw edge and resiliently urged outwardly of said face of said first wall.

The mechanism in accordance with the present invention permits the simple, inexpensive and rapid modification of conventional equipment greatly to increase the capacity and versatility thereof, permitting a greater variety and larger combination of products to be simultaneously produced and packaged or bagged.

BRIEF DESCRIPTION OF THE DRAWINGS

FIG. 3 is a fragmentary side elevational view of the metering and mold filling mechanism in accordance with the present invention;

FIG. 4 is a sectional view taken along line 4-4 in FIG. 3;

FIG. 5 is a sectional view taken along line 5-5 in FIG. 3;

FIG. 6 is a fragmentary top plan view of a mold strip in accordance with the present invention;

FIG. 7 is a sectional view taken along line 7-7 in FIG. 4;

FIG. 8 is a sectional view taken along line 8-8 in FIG. 5;

FIG. 9 is a fragmentary front elevational view of the mold strip;

FIG. 10 is a fragmentary front elevational view of an extractor bar in accordance with the present invention;

FIG. 11 is a sectional view taken along line 11-11 in FIGS. 10 and 13;

FIG. 12 is a sectional view taken along line 12-12 in FIGS. 10 and 13; and

FIG. 13 is a sectional view taken along line 13-13 in FIG. 12.

DESCRIPTION OF THE PREFERRED EMBODIMENT

Figure 1:
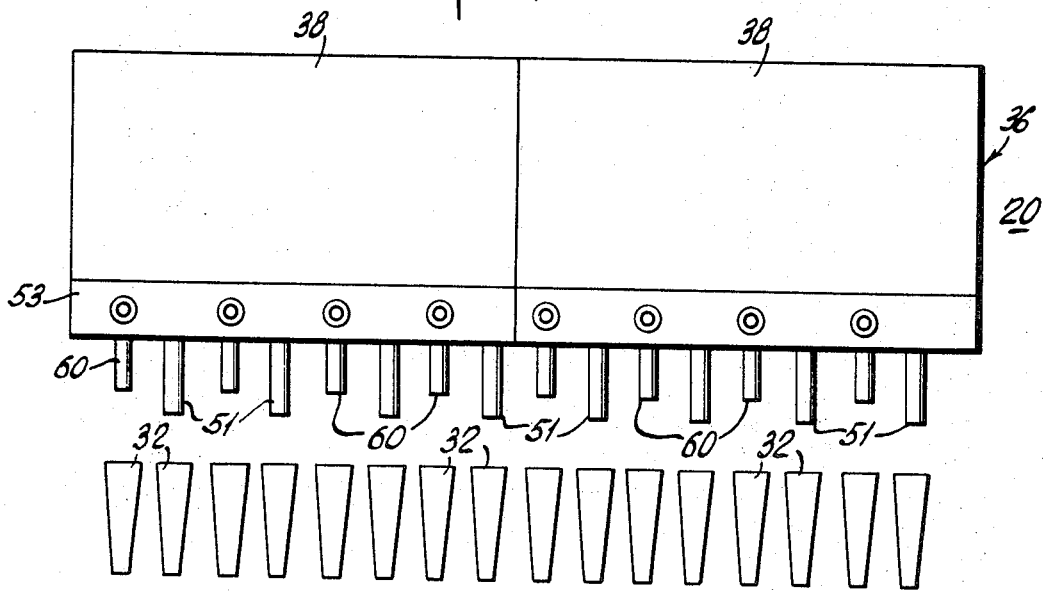
FIG. 1 is a diagrammatic front elevation view of a reservoir and mold filler structure constructed according to and embodying the present invention.
Figure 2:
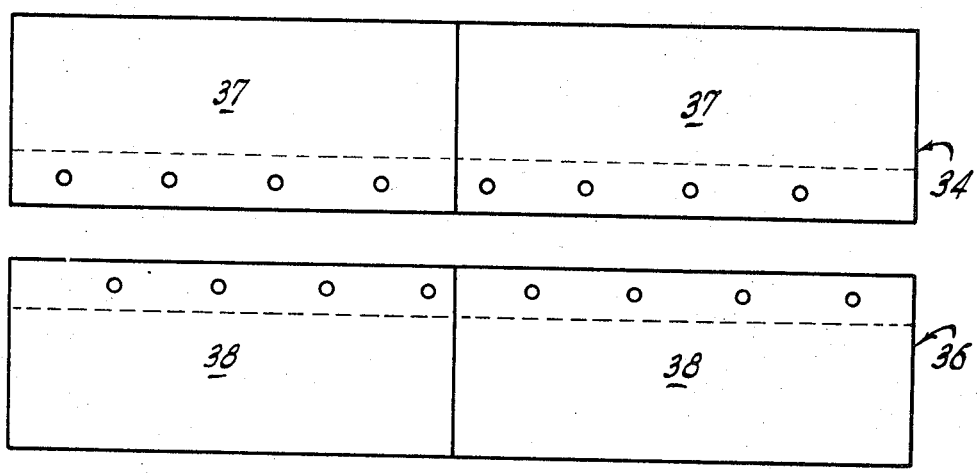
FIG. 2 is a diagrammatic top plan view thereof.

Referring now to the drawings, which illustrate a preferred embodiment of the present invention, reference numeral 20 generally designates the mold filling station of an improved frozen stick confection machine which includes a pair of transversely spaced similar sprocket chains 21 supported between corresponding sprocket wheels (not shown) and intermittently advanced along a predetermined longitudinal path. Secured to sprocket chains 21 are regularly spaced opposite angular brackets 22 terminating in inwardly directed top legs 23. Located on each leg 23 is a pair of longitudinally spaced positioning buttons 24 each including an upwardly projecting shank terminating in an enlarged head.

Extending between and resting on each pair of opposite bracket legs 23 is a mold strip 26 which includes a top plate or bar 27 provided with depending longitudinal flanges 28 and having longitudinally spaced recesses 29 formed in its end sections, the recesses of one pair being provided with side edges converging from the end of the plate 27. The end sections of each plate 27 rest on respective bracket legs 23, recesses 29 engaging the shanks of corresponding buttons 24 to maintain mold strips 26 in predetermined positions on bracket legs 23. As in the conventional frozen stick confection machine, mold strips 26 are intermittently advanced by chains 21 in the known manner along a predetermined path through filling station 20, then downwardly and then longitudinally partially immersed in a freezing liquid circulated through a longitudinal trough, and through a stick inserting station located between the ends of the freezing trough. Upon leaving the freezing trough, the mold strip mold surfaces are exposed to a hot liquid at a separating station, the confection sticks being engaged by extractor bars which move upwardly relative to the molds to remove the frozen confections and transfer them to a bagging station. The mold strips are then conveyed along a bottom return run to the filling station 27.

Formed in each plate 20 are a plurality of transversely spaced pairs of closely spaced openings 30, illustrated herein as square in shape although other configurations may be employed, the separation between the openings 30 of each pair being smaller than the separation of adjacent pairs thereof. Cavity-defining open-topped molds 32 formed of any suitable heat conducting material and of any desired shape are secured to and depend from plate 27, the top borders or rims of each thereof being of the shape of and registering with and engaging a respective opening 30. Mold strip assembly 26 is reinforced by a transverse cross rod 33 extending along and welded to the bottoms of molds 32 of each mold strip 26.

Filling station 20 includes leading and trailing reservoir sections 34 and 36 respectively, each reservoir section including a pair of separate hoppers 37 and 38 respectively, it being understood that any desired number of hoppers, up to one half the number of cavity molds in each mold strip may be provided in each reservoir section. A liquid composition is contained in each of the hoppers, which composition may be frozen to produce the desired frozen confection, for example ice cream, sherbet, water ice, fudge confections and the like.

Associated with each hopper 37 are one or more metering and filler nozzle assemblies 39, and associated with each hopper 38 are one or more metering and filler nozzle assemblies 35. Each assembly 39 includes a metering pump 40, preferably a piston pump of known construction having an inlet conduit 41 connecting the pump cylinder chambers 42 to a respective hopper 37 by way of a check valve (not shown) permitting the flow of liquid only from the hopper into cylinder chamber 42. A gang of pistons cooperate with the pump cylinders and are actuated in synchronism with the conveyor chain drive so that during the intermittent rest period of the sprocket chains 21 a forward or discharge stroke of the pistons is effected.

A mounting plate 43 is releasably secured to the underface of the gang of side by side pump cylinder chambers 42 and has apertures formed therein registering with the outlet ports 45 of corresponding cylinder chambers 42. Curved nozzle coupling pipes 44 include vertical upper legs 46 secured to and engaging corresponding openings in plate 43, suitable O-ring gaskets 47 registering with the enlarged bottom sections of the ports 45. Depending from each pipe leg 46 and inclined laterally and rearwardly is an intermediate section 48 which terminates in a depending vertical pipe section 49. A coupling collar 50 is secured to and depends from each pipe section 49 and engages a depending vertical filler nozzle 51 of well known construction, having a bottom discharge opening and provided with the usual check valve which permits the flow of liquid therefrom under the pressure of the advancing pump piston. Nozzles 51 are transversely spaced from each other a distance equal to that between alternate mold cavities 32 on mold strips 26 carried by chains 21, the nozzle discharge openings being in vertical alignment with the longitudinal paths of alternate molds 32. As seen in FIG. 3, the bottoms of nozzles 51 are disposed shortly above and register with the respective molds 32 in their rest position along their downwardly inclined paths to the freezer trough.

A mounting plate 52 is suitably releasably secured to the underface of the ganged pump cylinder chambers 53 of piston pumps 54 which are associated with hoppers 38 in the same manner piston pumps 40 are associated with hoppers 37, and are synchronously operated with and constructed in the same manner as pumps 40. Forwardly downwardly and laterally inclined bores 56 are formed in plate 52 and communicate with the pump cylinder chamber outlet ports 57 and are hermetically sealed thereto by O-ring gaskets 58. Depending from and secured to plate 52 in registry with the bottom of each bore 56 is a coupling collar 59 which is engaged by a filler nozzle 60 of the same construction as filler nozzles 51 and, like filler nozzles 51, is provided with a check valve.

Nozzles 60 are transversely offset relative to nozzles 51 being in vertical alignment with the longitudinal paths of alternate molds 32 positioned between the mold paths underlying nozzles 51. The bottom discharge openings of nozzles 51 are in vertical registry with and shortly above the corresponding molds 32 at their rest positions along their horizontal paths and are longitudinally spaced from the molds registering with the nozzles 51 by an intervening pair of mold strips 26. Thus, during each rest period of mold strips 26, the metering pumps are actuated to fill different alternate molds of a pair of mold strips with corresponding desired compositions, all of the molds of the strip carried past nozzles 51, 60 being filled.

Referring now to FIGS. 10 to 13 of the drawings, which illustrate an improved form of extractor member 65 advantageously employed where frozen stick confections are handled and bagged in pairs, the extractor member comprises an elongated bar 66 including a main intermediate section 67 and opposite end sections 68. End sections 68 include outwardly directed upwardly offset ears 69 backed by upper rear walls 70 which facilitate mounting of bar 66 to the conventional extractor bar actuating and conveying mechanism.

Formed in intermediate section 67 and extending for substantially the full length thereof is a slot 71, the lower opposing faces 72 of which converge upwardly to a restricted upper part 73 of the slot. Extending along the rear of the slot 71 is a vertical upwardly directed wall 74 and extending along the front of the slot 71 is a forwardly directed wall 76. A longitudinally extending bearing groove 77 of arcuate transverse cross section is formed in the top outer face of wall 76, groove 77 being interrupted along its length by regularly longitudinally spaced flat sections 78, the bottom rear faces of which terminate in depending shoulders to delineate notches 79. The center-to-center spacing of flat sections 78 correspond to the center-to-center spacing between adjacent pairs of molds 32.

A plurality of stick gripping members 80 are rockably mounted on bar 66 and medially positioned relative to corresponding flat sections 78. Each gripping member 80 is an integrally formed unit and includes an upwardly projecting actuating arm or plate 81 provided at its bottom with a forwardly bent section 82. A rearwardly upwardly inclined jaw plate 83 is joined along its inner edge by an integrally formed longitudinal arcuate or cylindrical knuckle 84 to the bottom of the arm section 82, knuckle 84 resting in the groove 87 flanking flat section 78 to permit rocking of the gripping member about the longitudinal axis of the groove 77.

A medially located opening 86 is provided in the lower part of arm 81 and in section 82 and tongue 87 formed therefrom projects rearwardly from the lower edge of the opening 86. Medially positioned on the upper face of jaw plate 83 between knuckle 84 and the free end of jaw plate 83 is a longitudinal ridge 88 terminating in rearwardly directed ridges 89. A split ring leaf spring 90 projects through each opening 86 around a corresponding tongue 89 and flat section 78, one end of spring 90 engaging a corresponding notch 79 and the other end thereof bearing on the upper face of the jaw plate 83 and engaging the rear bottom edge of a respective ridge 88. Springs 90 resiliently urge the stick gripping members 80 clockwise, as viewed in FIGS. 11 and 12, resiliently to urge the free elongated outer edges 91 of the jaw plate toward engagement with the confronting face of the wall 74, the jaw plate edges 91 being in vertical alignment with slots 73.

Formed in wall 74 opposite each gripping member 80 and shortly above the free edge 91 thereof is a pair of transverse cylindrical bores 92 medially located relative to gripping member 80 and having a center-to-center distance equal to that of adjacent molds 32 of a pair thereof. A ball detent 94 is slidably located in each bore 92, the inner ends of the bores being slightly restricted to permit only the partial emergence of the balls through the bore inner end openings. A plate 96 extends along and is secured by screws 95 to the rear face of wall 67 and closes the outer openings of bores 92. A helical compression spring 97 is located in each bore 92 and is entrapped between the ball detent 94 and plate 96 resiliently to urge ball detents 94 into positions projecting beyond the front faces of wall 67.

In the employment of extractor member 65 following the freezing of the confection, a mold strip 26 and an extractor member 65 are transported so as to approach each other in vertical alignment, confection sticks S projecting upwardly through slots 71 past jaw edges 91, rocking the jaws counter-clockwise against springs 90. A pair of sticks S is gripped between each jaw edge 91 and a pair of ball detents 94 and wall 67. It is important to note that ball detents 94 permit each gripping member 80 to engage a pair of sticks S positively even when sticks S are of substantially different thicknesses. The mold strips and extractor members, following the heating of molds 32, are then advanced along vertically diverging paths so that the extractor members pull the confections from the molds by means of the self-locking jaw plates 83 and sticks S, the frozen stick confections being thereafter released by positively swinging the arm 81 counterclockwise.

While there has been described and illustrated a preferred embodiment of the present invention it is apparent that numerous alterations, omissions and additions may be made without departing from the spirit thereof.

We claim:

1. A frozen stick confection extractor comprising a bar having vertically extending stick receiving slots located along the length thereof bordered on one side by a first wall projecting above said slot and along the second side by a second wall, a jaw member swingably mounted on said second wall and having a stick engaging edge located in vertical registry with at least one of said slots and resiliently urged toward said first wall, and a plurality of detents positioned along the face of said first wall opposite said jaw edge and resiliently urged outwardly of said face of said first wall.

2. The frozen stick confection extractor of claim 1, including a jaw opening lever connected to each of said jaw members and swingable therewith.

3. The frozen stick confection extractor of claim 1, wherein said slots are defined by a continuous elongated slot and plurality of longitudinally spaced of said jaw members are mounted on said second wall and a pair of said detents are positioned opposite each of said jaw members.

4. The frozen stick confection extractor of claim 1, wherein said first wall has transverse bores formed therein, said detents slidably registering with said bores, and including compression springs positioned in said bores and bearing on the inner faces of said detents.